US011109347B2

United States Patent
Na (10) Patent No.: US 11,109,347 B2
(45) Date of Patent: Aug. 31, 2021

(54) BASE STATION DEVICE AND METHOD FOR PERFORMING PAGING BY SAME BASE STATION DEVICE, AND TERMINAL DEVICE AND METHOD FOR SUPPORTING PAGING BY SAME TERMINAL DEVICE

(71) Applicant: SK TELECOM CO., LTD., Seoul (KR)

(72) Inventor: Min Soo Na, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 16/648,798

(22) PCT Filed: Jan. 10, 2018

(86) PCT No.: PCT/KR2018/000477
§ 371 (c)(1),
(2) Date: Mar. 19, 2020

(87) PCT Pub. No.: WO2019/059463
PCT Pub. Date: Mar. 28, 2019

(65) Prior Publication Data
US 2020/0221419 A1 Jul. 9, 2020

(30) Foreign Application Priority Data
Sep. 22, 2017 (KR) .................. 10-2017-0122518

(51) Int. Cl.
*H04W 68/02* (2009.01)
*H04W 16/28* (2009.01)

(52) U.S. Cl.
CPC ........... *H04W 68/02* (2013.01); *H04W 16/28* (2013.01)

(58) Field of Classification Search
CPC ................ H04W 68/02; H04W 7/06
See application file for complete search history.

(56) References Cited

U.S. PATENT DOCUMENTS

| 2010/0323610 | A1 | 12/2010 | Li et al. |
| 2014/0128109 | A1 | 5/2014 | Li et al. |
| 2014/0181200 | A1 | 6/2014 | Huang et al. |
| 2016/0119762 | A1 | 4/2016 | Zhu et al. |
| 2020/0092846 | A1* | 3/2020 | Deng .................. H04B 7/0695 |

FOREIGN PATENT DOCUMENTS

| KR | 10-2010-0081360 | 7/2010 |
| KR | 10-2012-0030094 | 3/2012 |
| KR | 10-2014-0058372 | 5/2014 |
| KR | 10-2016-0009038 | 1/2016 |
| WO | WO 2016-172652 | 10/2016 |

OTHER PUBLICATIONS

International Search Report dated Jun. 20, 2018 issued in Application No. PCT/KR2018/000477.
Korean Office Action dated Nov. 19, 2018 issued in Application No. 10-2017-0122518 (English translation attached).
Korean Office Action dated Nov. 19, 2018 issued in Application No. 10-2018-0076743 (English translation attached).

* cited by examiner

*Primary Examiner* — Muthuswamy G Manoharan
(74) *Attorney, Agent, or Firm* — KED & Associates LLP (57) ABSTRACT

Disclosed is a technology for improving paging efficiency in a communication system by implementing a new paging method (scheme) of minimizing signaling load of a radio section and accurately and rapidly performing paging without performance deterioration when paging is performed in a MIMO communication system.

10 Claims, 6 Drawing Sheets

BASE STATION DEVICE AND METHOD FOR PERFORMING PAGING BY SAME BASE STATION DEVICE, AND TERMINAL DEVICE AND METHOD FOR SUPPORTING PAGING BY SAME TERMINAL DEVICE

CROSS-REFERENCE TO RELATED PATENT APPLICATIONS

This application is a U.S. National Stage Application under 35 U.S.C. § 371 of PCT Application No. PCT/KR2018/000477, filed Jan. 10, 2018, which claims priority to Korean Patent Application No. 10-2017-0122518, filed Sep. 22, 2017, whose entire disclosures are hereby incorporated by reference.

BACKGROUND OF THE INVENTION

1. Field of the Invention

The present disclosure relates to a paging technology in a MIMO communication system.

2. Description of the Prior Art

In a communication system, there are various technologies for communication using a beamforming technology based on a plurality of antenna beams when a transmission device and a reception device have a plurality of antennas. A representative technology thereof is a Multiple Input Multiple Output (MIMO) technology.

In a communication system using the MIMO technology (hereinafter, referred to as a MIMO communication system), it may be expected that a transmission capacity gain is proportional to the number of transmission antennas and the number of reception antennas without using an additional frequency or power.

Meanwhile, in a mobile communication system, when a terminal (hereinafter, referred to as an idle terminal) in the state in which radio section access with a BS is released (for example, an idle state or an RRC inactive state) receives a communication request (for example, a terminated call), a paging technology for processing the communication request (for example, a terminated call) is used.

In a brief description of the conventional paging method, the BS apparatus allocates resources (Paging Occasion: PO) for paging to each terminal in radio resources designated for paging in each of predefined paging cycles (DRX cycles).

The idle terminal monitors whether a paging signal aiming for the idle terminal itself is received in PO resources allocated to the idle terminal itself.

When a communication request (for example, a terminated call) for the idle terminal is received, the BS performs paging by transmitting a paging signal to the corresponding idle terminal in PO resources allocated to the corresponding idle terminal.

At this time, in the conventional paging method, the idle terminal uses, for example, a Temporary Mobile Subscriber ID (TMSI) (40 bits) or an International Mobile Subscriber Identity (IMSI) (64 bits) as identification information for identifying a paging signal for the idle terminal itself.

When the conventional paging method is directly applied to a MIMO communication system, the BS transmits one paging signal aiming for one idle terminal for each of a plurality of (N) antenna beams.

Accordingly, in the MIMO communication system, signaling load of the radio section rapidly increases during paging.

Particularly, according to RAN-based notification area management defined in the 5G environment (technology), the BS transmits one paging signal aiming for one idle terminal for each of a plurality of (N) antenna beams formed in a plurality of (M) cells, so that a rapid increase in signaling load of the radio section during paging is very serious.

Accordingly, when paging is performed in the MIMO communication system, a new paging method (scheme) of minimizing signaling load of the radio section and performing accurate and rapid paging without performance deterioration is needed.

SUMMARY OF THE INVENTION

The present disclosure provides a new paging method (scheme) of minimizing signaling load of a radio section and accurately and rapidly performing paging when paging is performed in a MIMO communication system.

In accordance with an aspect of the present disclosure, an apparatus of a Base Station (BS) is provided. The apparatus includes: an identification unit configured to identify, for a terminal to be paged, a paging ID of a paging group to which the terminal to be paged belongs; a transmission unit configured to transmit the identified paging ID in different directions through a beam sweeping operation for transmitting beamformed signals in different directions through a plurality of antenna beams; and a paging performance unit configured to identify the terminal to be paged among terminals receiving the paging ID, based on paging-related information returned from the terminal receiving the paging ID and perform a paging procedure for the identified terminal to be paged.

Specifically, the transmission unit may be configured to perform the beam sweeping operation in paging resource pre-allocated to the terminal to be paged.

Specifically, the paging performance unit may be configured to recognize a specific antenna beam which the terminal to be paged can receive a downlink, based on paging-related information returned from the terminal to be paged and perform a paging procedure for the terminal to be paged through the recognized specific antenna beam.

Specifically, the specific antenna beam may be an antenna beam used when the terminal to be paged receives the paging ID among antenna beams for transmitting the paging ID in different directions through the beam sweeping operation.

Specifically, the paging performance unit may be configured to recognize the specific antenna beam, based on cell information and beam information included in the paging-related information returned from the terminal to be paged.

Specifically, the paging performance unit may be configured to recognize, as the specific antenna beam, an antenna beam of a specific time slot related to uplink resources through which the paging-related information is returned from the terminal to be paged among a plurality of time slots of paging resources pre-allocated to the terminal to be paged.

In accordance with another aspect of the present disclosure, a method of performing paging by a Base Station (BS) apparatus is provided. The method includes: an identification step of identifying, for a terminal to be paged, a paging ID of a paging group to which the terminal to be paged belongs; a transmission step of transmitting the identified paging ID in different directions through a beam sweeping operation for transmitting beamformed signals in different directions through a plurality of antenna beams; and a paging performance unit of identifying the terminal to be paged among terminals receiving the paging ID, based on paging-related information returned from the terminal receiving the paging ID and performing a paging procedure for the identified terminal to be paged.

Specifically, the paging performance step may include recognizing a specific antenna beam which the terminal to be paged can receive a downlink, based on paging-related information returned from the terminal to be paged and performing the paging procedure for the terminal to be paged through the recognized specific antenna beam.

Specifically, the paging performance step may include recognizing the specific antenna beam, based on cell information and beam information included in the paging-related information.

Specifically, the paging performance step may include recognizing, as the specific antenna beam, an antenna beam of a specific time slot related to uplink resources through which the paging-related information is returned from the terminal to be paged among a plurality of time slots of paging resources pre-allocated to the terminal to be paged.

In accordance with another aspect of the present disclosure, an apparatus of a terminal is provided. The apparatus includes: a monitoring unit configured to monitor reception of a paging ID in pre-allocated paging resources; and a paging-related information return unit configured to, when receiving the paging ID, return paging-related information indicating a specific antenna beam which the apparatus of the terminal can receive in a downlink, thereby when the apparatus of the terminal is a terminal to be paged, a Base Station (BS) transmitting the paging ID being able to identify the apparatus of the terminal as the terminal to be paged, based on the paging-related information and perform a paging procedure for the apparatus of the terminal.

Specifically, the paging-related information may include terminal identification information of the apparatus of the terminal, and cell information and beam information of the specific antenna beam used when the apparatus of the terminal receives the paging ID.

Specifically, the paging-related information may include terminal identification information of the apparatus of the terminal, and the paging-related information return unit is configured to return the paging-related information through uplink resources related to a time slot when the paging ID is received among a plurality of time slots of the pre-allocated paging resources.

In accordance with another aspect of the present disclosure, a method of supporting paging of a terminal apparatus is provided. The method includes: a monitoring step of monitoring reception of a paging ID in pre-allocated paging resources; and a paging-related information return step of, when the paging ID is received, returning paging-related information indicating a specific antenna beam which the apparatus of the terminal can receive a downlink, thereby a Base Station (BS) transmitting the paging ID being able to identify the apparatus of the terminal as a terminal to be paged, based on the paging-related information and perform a paging procedure for the apparatus of the terminal.

Specifically, the paging-related information may include terminal identification information of the apparatus of the terminal, and cell information and beam information of the specific antenna beam used when the apparatus of the terminal receives the paging ID.

Specifically, the paging-related information may include terminal identification information of the apparatus of the terminal, and the paging-related information return step may include returning the paging-related information through uplink resources related to a time slot when the paging ID is received among a plurality of time slots of the pre-allocated paging resources.

According to an embodiment of the present disclosure, it is possible to derive an effect of improving paging efficiency by implementing a new paging method (scheme) of minimizing signaling load of a radio section and accurately and rapidly performing paging without performance deterioration when paging is performed in a MIMO communication system.

DETAILED DESCRIPTION OF THE EXEMPLARY EMBODIMENTS

Hereinafter, the present disclosure will be described with reference to the accompanying drawings.

Figure 1:
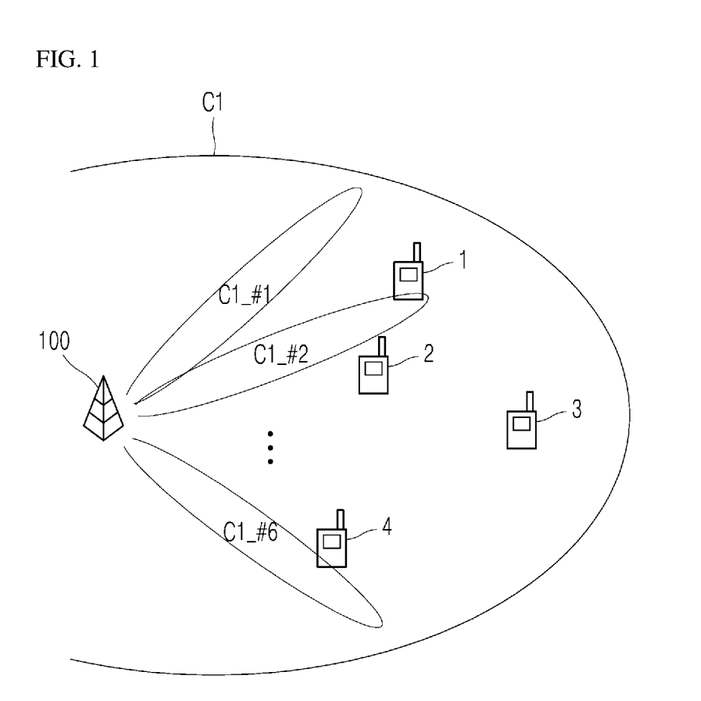
FIG. 1 illustrates a communication system using a beamforming technology based on a plurality of antenna beams to which the present disclosure is applied.

FIG. 1 illustrates a communication system using a beamforming technology based on a plurality of antenna beams to which the present disclosure is applied, represented by a Multiple Input Multiple Output (MIMO) communication system.

As illustrated in FIG. 1, a mobile communication system for transmitting and receiving a signal between a base station and a terminal is described as a communication system using a beamforming technology based on a plurality of antenna beams (hereinafter, referred to as a MIMO system).

A Base Station (BS) 100 may include a plurality of antennas, form a plurality of antenna beams therethrough, and transmit and receive beamformed signals in different directions.

Terminals 1, 2, 3, and 4 may also include a plurality of antennas, form a plurality of antenna beams, and transmit and receive beamformed signals in different directions.

Particularly, the present disclosure considers a mobile communication network environment, for example, a 5th generation mobile communication network (hereinafter, referred to 5G) environment aiming for an Ultra Reliable and Low Latency Communication (URLLC) service.

In the 5G environment (technology), Radio Access Network (RAN)-based notification area management by which one BS groups a plurality of (M) cells by one identifier (RAN area ID) to operate the cells is defined.

According to the RAN-based notification area management, the BS does not need to receive a location report from a terminal moving between cells grouped by one identifier (RAN area ID).

For example, it is assumed that the BS 100 groups three (M=3) cells (C1, C2, and C3) by one identifier (RAN area ID) to operate the cells.

In this case, the BS 100 operates its own cells C1, C2, and C3 according to RAN-based notification area management in which reception of the location report from the terminal 10 is not required during movement between cells.

Then, the BS 100 may form a plurality of (N) antenna beams for each of the three (M=3) cells (C1, C2, and C3).

However, for convenience of description, hereinafter, it is assumed that the number of a plurality of (N) antenna beams which the BS 100 forms for each cell is 6 (N=6) and only one cell (C1) among the three (M=3) cells (C1, C2, and C3) will be described.

Meanwhile, in a mobile communication system, when a communication request for a terminal (for example, a terminated call) in the state in which radio section access with the BS is released (for example, an idle state or an RRC inactive state) is received, a paging technology for processing the communication request (for example, a terminated call) is used.

The terminal operating in the state in which radio section access with the BS is released is a terminal operating in an idle state (hereinafter, referred to as an idle terminal) in which both radio section access and access between the BS and a core network for the terminal are released or a terminal operating an inactive state (hereinafter, referred to as an inactive terminal) in which only radio section access is released but access between the BS and the core network for the terminal is connected.

However, for convenience of description, the idle terminal is described hereinafter.

In a description of a conventional paging scheme based on the BS 100, the BS 100 allocates resources for paging, that is, paging resources (Paging Occasions: PO) to each terminal among radio resources designated for paging in units of predefined paging cycles (DRX cycles).

For example, the BS 100 allocates paging occasions (PO) to each of terminals 1, 2, 3, and 4.

The idle terminal monitors whether a paging signal aiming for the idle terminal itself is received in PO resources allocated to the idle terminal itself.

When a communication request (for example, a terminated call) for the idle terminal is received, the BS 100 performs paging by transmitting a paging signal to the corresponding idle terminal in PO resources allocated to the corresponding idle terminal.

At this time, in the conventional paging scheme, the idle terminal uses, for example, a Temporary Mobile Subscriber ID (TMSI) (40 bits) or an International Mobile Subscriber Identity (IMSI) (64 bits) as identification information for identifying a paging signal aiming for the idle terminal itself.

That is, the BS 100 performs paging with the corresponding idle terminal by transmitting a paging signal (paging request message) including terminal identification information (TMSI or IMSI) of the corresponding idle terminal in PO resources allocated to the idle terminal.

When the conventional paging scheme is directly applied to the MIMO communication system illustrated in FIG. 1, the BS 100 transmits the same paging signal to the same idle terminal according to each of a plurality of antenna beams, that is, six antenna beams #1, #2 . . . , #6 formed by the three cells C1, C2, and C3.

For example, it is assumed that terminal 2 is in the idle state and a communication request (for example, a terminated call) for terminal 2 is received.

In this case, when the BS 100 follows the conventional paging scheme in the MIMO system, the BS transmits the paging signal (paging request message) including terminal identification information (TMSI or IMSI) of terminal 2 in PO resources allocated to terminal 2 for each of six antenna beams C1_#1, C1_#2 . . . , C1_#6 in cell C1, for each of six antenna beams C2_#1, C2_#2 . . . , C2_#6 in cell C2, and for each of six antenna beams C3_#1, C3_#2 . . . , C3_#6 in cell C3.

As described above, when the conventional paging scheme is directly applied to the 5G environment MIMO system, the BS 100 transmits the same paging signals (paging request messages) including terminal identification information (TMSI or IMSI) in no small size which correspond to the product of the number (M) of cells and the number (N) of antenna beams, so that a phenomenon may occur in which signaling load in the radio section significantly increases during paging.

Accordingly, the present disclosure proposes a new paging scheme (method) of minimizing an increase in signaling load in the radio section and enabling rapid and accurate paging without deterioration of performance during paging in the MIMO system in order to fit the RAN-based notification area management defined in the future 5G environment (technology).

Hereinafter, a BS apparatus and a terminal apparatus for implementing a paging scheme (method) proposed by the present disclosure will be described with reference to FIGS. 2 and 3. At this time, for convenience of description, reference numerals illustrated in FIG. 1 are used.

First, a BS apparatus according to an embodiment of the present disclosure is first described with reference to FIG. 2.

Figure 2:
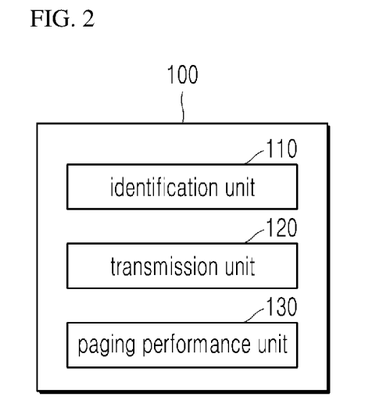
FIG. 2 illustrates the configuration of a BS apparatus according to an embodiment of the present disclosure.

As illustrated in FIG. 2, for a terminal to be paged, the BS 100 includes an identification unit 110 configured to identify a paging ID of a paging group to which the terminal to be paged belongs, a transmission unit 120 configured to transmit the identified paging ID in a plurality of different directions through a beam sweeping operation for transmitting beamformed signals in different directions through a plurality of antenna beams, and a paging performance unit 130 configured to identify the terminal to be paged among terminals receiving the paging ID on the basis of paging-related information replied by the terminals receiving the paging ID and perform a paging procedure for the identified terminal to be paged.

For the terminal, to be paged, for which a paging request is received from the core network, the identification unit 110 identifies a paging ID of the paging group to which the corresponding terminal to be paged belongs.

To this end, it is preferable that the BS apparatus 100 according to the present disclosure manages a paging group for each terminal and a paging ID for each paging group.

In the present disclosure, a method of managing a paging group for each terminal and a method of managing a paging ID for each paging group are not limited to specific methods but may include various methods.

For example, the BS apparatus 100 may manage paging group information generated when the corresponding terminal maps terminal identification information (for example, a UE ID) of the terminal to an allocated paging group on the basis of the terminal identification information (for example, the UE ID) used to identify the terminal in the future 5G environment (technology).

At this time, in the present disclosure, a method of determining a paging group to which the terminal is allocated is also not limited to a specific method but may include various methods.

For example, it is assumed that the BS apparatus 100 operates L paging groups and the BS apparatus 100 may allocate/map terminal identification information (for example, the UE ID) of terminal 1 to paging groups sequentially or randomly selected from the L paging groups at a time point at which the terminal (for example, terminal 1) enters a state in which radio section access with the BS apparatus 100 (for example, an idle terminal or an inactive terminal) is released and manage paging group information.

Alternatively, the BS apparatus 100 may manage paging group allocation information for each cell C1, C2, or C3 of the BS apparatus 100 or each combination of location-based antenna beams within each cell C1, C2, or C3.

Accordingly, the BS apparatus 100 may detect the location of terminal 1 on the basis of the last antenna beams used by terminal 1 at the time point at which the terminal (for example, terminal 1) enters the state (idle terminal or inactive terminal) in which radio section access with the BS apparatus 100 is released, allocate/map terminal identification information (for example, the UE ID) of terminal 1 to a paging group at the corresponding location or related to the last antenna beam, and manage paging group information on the basis of paging group allocation information.

Of course, in additional thereto, the BS apparatus 100 may manage the paging group for each terminal in various methods.

Meanwhile, the BS apparatus 100 may configure and manage a paging ID (Paging Indicator: PI) for each paging group operated as described above.

According to the present disclosure, terminals managed as the same paging group by the BS apparatus 100 may be considered to use the same paging ID, that is, the same PI.

According to the present disclosure, it is premised that the terminal (idle terminal or inactive terminal) waiting for paging recognizes the paging ID, that is, the PI to be used by the terminal.

Hereinafter, for convenience of description, it is assumed that all of terminals 1, 2, 3, and 4 are in the state in which radio section access is released (for example, an idle state or an RRC inactive state), and it is assumed that terminals 1, 2, and 4 are managed as the same paging group and use the same paging ID, that is, the same PI and terminal 3 is managed as another paging group and uses another PI.

In a description of the identification unit 110, when there is a terminal (for example, terminal 2), to be paged, receiving a paging request from a core network, for the corresponding terminal, that is, terminal 2 to be paged, the identification unit 110 identifies a paging ID, that is a PI of a paging group to which terminal 2 belongs.

At this time, it is preferable that the paging ID (PI) is defined to have a size smaller than that of the conventional terminal identification information (TMSI or IMSI) or the terminal identification information (for example, the UE ID) used to identify the terminal in the future 5G environment (technology).

The transmission unit 120 transmits the paging ID identified by the identification unit 110, that is, the paging ID (PI) of the paging group to which terminal 2 belongs in a plurality of different directions through a beam sweeping operation for transmitting beamformed signals in different directions through a plurality of antenna beams.

More specifically, the transmission unit 120 may transmit the paging ID (PI) of the paging group to which terminal 2 belongs by performing the beam sweeping operation in paging resources, that is, PO resources pre-allocated to the terminal to be paged, that is, terminal 2.

The PO resources allocated to the terminal may include a plurality of time slots, for example, time slots in units of subframes or time slots in units of OFDM symbols.

In each time slot included in the PO resources, beamformed signals (for example, IP) may be transmitted through a signal antenna beam or a set of antenna beams formed in a direction different from that of another time slot.

Hereinafter, for convenience of description, it is assumed that the BS apparatus 100 operates three (M=3) cells (C1, C2, and C3) and forms six (N=6) antenna beams #1, #2 . . . , #6 for each cell.

Based on the assumption, the transmission unit 120 transmits the PI of the paging group to which terminal 2 belongs for each of six antenna beams C1_#1, C1_#2 . . . , C1_#6 in cell C1, for each of six antenna beams C2_#1, C2_#2 . . . , C2_#6 in cell C2, and for each of six antenna beams C3_#1, C3_#2 . . . , C3_#6 in cell C3 by performing the beam sweeping operation for transmitting the paging ID (PI) of the paging group to which terminal 2 belongs in PO resources pre-allocated to terminal 2.

Meanwhile, each of terminals 1, 2, 3, and 4 monitors whether to receive a signal (for example, the paging ID (PI)) aiming for the terminal in PO resources allocated to the terminal.

Accordingly, terminal 2 receives the paging ID (PI) which the BS apparatus 100 transmits in PO resources allocated to terminal 2, and if terminals 1 and 4 also receive allocation of the PO resources which are the same as those of terminal 2, terminals 1 and 4 receive the paging ID (PI) which the BS apparatus 100 transmits.

It has been previously assumed that terminals 1, 2, and 4 are managed as the same paging group and use the same paging ID (PI).

Accordingly, not only terminal 2 but also terminals 1 and 4 return paging-related information to the BS apparatus 100 in response to reception of the paging ID (PI) of the terminal and, more specifically, return paging-related information indicating a specific antenna beams which can be received by the terminal in downlink to the BS apparatus 100.

The paging performance unit 130 identifies a terminal to be paged among the terminals receiving the paging ID (PI) on the basis of paging-related information returned by the terminal receiving the paging ID (PI) which the transmission unit 120 transmits and performs a paging procedure for the identified terminal to be paged.

More specifically, the paging-related information returned by the terminal basically includes terminal identification information (for example, the UE ID) of the terminal returning the corresponding paging-related information.

Accordingly, when paging-related information is returned by a plurality of terminals receiving the paging ID (PI) which the transmission unit 120 transmits, the paging performance unit 130 may identify a terminal having terminal identification information (for example, the UE ID) that matches the terminal identification information (for example, the UE ID of terminal 2) of the terminal to be paged among terminals 1, 2, and 4 of the terminal identification information (for example, the UE ID) included in the paging-related information as the terminal to be paged.

According to the aforementioned embodiment, the paging performance unit 130 identifies terminal 2 among the plurality of terminals 1, 2, and 4 receiving the paging ID (PI) which the transmission unit 120 transmits as the terminal to be paged.

Further, the paging performance unit 130 recognizes a specific antenna beam which terminal 2 can receive in downlink on the basis of paging-related information returned by the identified terminal to be paged, that is, terminal 2 and performs a paging procedure for terminal 2 on the basis of the recognized specific antenna beam.

Specifically, the paging performance unit 130 may transmit paging response Ack to terminal 2 identified as the terminal to be paged and allow terminal 2 to recognize that the paging procedure is continuously performed, and then perform a general base procedure for paging.

Accordingly, the BS apparatus 100 does not perform the paging procedure any more for terminals 1 and 4 having no actual paging request (for example, generation of a terminated call).

The paging performance unit 130 transmits paging response Ack and performs the following paging procedure on the basis of a recognized specific antenna beam which can be received by terminal 2 in downlink.

The specific antenna beam which can be recognized in paging-related information returned by the terminal to be paged, that is, terminal 2 is an antenna beam used when terminal 2 receives the paging ID (PI), that is, an optimal antenna beam among antenna beams for transmitting the paging ID in different directions through the beam sweeping operation.

The antenna beam used when terminal 2 receives the paging ID (PI) is an antenna beam through which terminal 2 receives the paging ID (PI) having the largest signal reception intensity aiming for terminal 2 among antenna beams (antenna beams C1_#1, C1_#2 . . . , C1_#6 of cell C1, antenna beams C2_#1, C2_#2 . . . , C2_#6 of cell C2, and antenna beams C3_#1, C3_#2 . . . , C3_#6 of cell C3) formed by the BS apparatus 100 in different directions through the beam sweeping operation for transmitting the paging ID (PI) of terminal 2.

That is, the specific antenna beam which can be recognized in paging-related information returned by the terminal to be paged, that is, terminal 2 is an antenna beam through which terminal 2 receives the paging ID (PI) having the largest signal reception intensity aiming for terminal 2.

A method of recognizing a specific antenna beam on the basis of paging-related information is described below in more detail.

According to an embodiment, the paging performance unit 130 may recognize a specific antenna beam which terminal 2 can receive in downlink on the basis of cell information and beam information included in the paging-related information returned by the identified terminal to be paged, that is, terminal 2.

Specifically, the paging-related information returned by the terminal basically includes terminal identification information (for example, the UE ID) of the terminal returning the corresponding paging-related information and may further include cell information and beam information indicating an antenna beam through which the terminal receives the paging ID (PI) having the largest signal reception intensity.

For example, when the BS apparatus 100 transmits the paging ID (PI) of the paging group to which terminal a2 belongs through the beam sweeping operation in a situation illustrated in FIG. 1, terminal 2 receives the paging ID (PI) having the largest signal reception intensity through antenna beam #2 of cell C1, that is, antenna beam C1_#2.

In this case, the paging-related information returned by terminal 2 may include terminal identification information (for example, the UE ID) of terminal 2, and cell information (C1) and beam information (#2) indicating antenna beam C1_#2.

Accordingly, the paging performance unit 130 may recognize specific antenna beam C1_#2 which terminal 2 can receive in downlink on the basis of cell information (C1) and beam information (#2) included in the paging-related information returned by terminal 2.

According to another embodiment, the paging performance unit 130 may recognize, as the specific antenna beam which terminal 2 can receive in downlink, an antenna beam of a specific time slot related to uplink resources through which paging-related information is returned by terminal 2 among a plurality of time slots of PO resources pre-allocated to the identified terminal to be paged, that is, terminal 2.

Specifically, the paging-related information from the terminal is returned through uplink resources related to a time slot when the terminal receives the paging ID (PI) aiming for the terminal among a plurality of time slots of PO resources pre-allocated to the terminal.

Then, in the situation illustrated in FIG. 1, terminal 2 receives the paging ID (PI) in a specific time slot at a time point at which the BS apparatus 100 transmits the paging ID (PI) through antenna beam #2 of cell C1, that is, antenna beam C1_#2 through the beam sweeping operation among a plurality of time slots included in pre-allocated PO resources.

In this case, the paging-related information from terminal 2 includes terminal identification information (for example, the UE ID) of terminal 2 and may be returned through uplink resources related to a specific time slot (a time slot of antenna beam C1_#2) in which terminal 2 receives the paging ID (PI)

The paging performance unit 130 may recognize an antenna beam of a specific time slot related to uplink resources, that is, antenna beam C1_#2 as a specific antenna which terminal 2 can receive in downlink on the basis of uplink resources through which paging-related information is returned from terminal 2.

The paging performance unit 130 may recognize a specific antenna beam which terminal 2 can receive in downlink as antenna beam C1_#2 on the basis of paging-related information of terminal 2 identified as the terminal to be paged.

Further, the paging performance unit 130 may perform a paging procedure for terminal 2 by transmitting paging response Ack to terminal 2 through recognized specific antenna beam C1_#2 and performing a general base procedure for future paging.

At this time, the paging ID, that is, the PI defined by the present disclosure has a size smaller than terminal identification information (for example, TMSI, IMSI, or UE ID) used in the conventional paging scheme and defined (used) in units of paging groups.

Accordingly, on the basis of the assumption that paging signals are transmitted to the same number of terminals to be paged, the data size (bit size) within the paging signal may be smaller in the case in which paging signals are transmitted on the basis of the paging ID, that is, the PI defined in the present disclosure than the case in which paging signals are transmitted on the basis of the conventional terminal identification information (TMSI, IMSI, or UE ID).

As described above, the BS apparatus 100 according to the present disclosure may newly define a paging ID (PI) in units of paging groups which has a size smaller than terminal identification information used in the conventional paging method and can be simultaneously used by a plurality of terminals, and identify a new paging method based on the paging ID (PI).

As described above, through a paging ID (PI)-based new paging method, the BS apparatus 100 according to the present disclosure may minimize signaling load of a radio section by minimizing a data size within a signal transmitted through each antenna beam when paging is performed in an unusual environment of the MIMO system in which the same paging signals corresponding to the number (N) of antenna beams are transmitted for paging, that is, in a future 5G environment in which paging signals corresponding to the product of the number (M) of cells and the number (N) of antenna beams are transmitted Further, the BS apparatus 100 according to the present disclosure may identify a terminal to be paged, for which actual paging is requested, and also recognize (identify) an optimal antenna beam to be used for a future paging procedure with the terminal to be paged on the basis of paging-related information returned from the terminal receiving the paging ID (PI), thereby performing rapid and accurate paging without performance deterioration.

Moreover, the BS apparatus 100 according to the present disclosure may use cell information (C1) and beam information (#2) within paging-related information returned from the terminal, for example, terminal 2 receiving the paging ID (PI) to schedule resources for terminal 2.

Hereinafter, a terminal apparatus according to an embodiment of the present disclosure is described with reference to FIG. 3.

Figure 3:
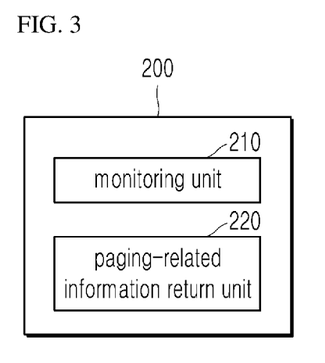
FIG. 3 illustrates the configuration of a terminal apparatus according to an embodiment of the present disclosure.

As illustrated in FIG. 3, the terminal apparatus 200 includes a monitoring unit 210 configured to monitor reception of a paging ID in pre-allocated paging resources and a paging-related information return unit 220 configured to return paging-related information indicating a specific antenna beam which the terminal apparatus 200 can receive in a downlink when receiving the paging ID and allow the BS transmitting the paging ID to identify the terminal apparatus 200 as the terminal to be paged on the basis of the paging-related information when the terminal apparatus 200 is the terminal to be paged and perform a paging procedure for the terminal apparatus 200.

The terminal apparatus 200 according to the present disclosure corresponds to each of terminals 1, 2, 3, and 4 illustrated in FIG. 1, and it is assumed that the terminal apparatus 200 is terminal 2 for convenience of description.

The monitoring unit 210 monitors reception of the paging ID in paging resources pre-allocated to the terminal apparatus 200, that is, PO resources.

That is, based on the assumption that the terminal apparatus 200 recognizes the paging ID (aiming for the terminal apparatus 200 itself), that is, the PI to be used by the terminal apparatus 200 itself, the monitoring unit 210 monitors whether a signal (for example, the paging ID (PI)) aiming for the terminal apparatus 200 is received in PO resources allocated to the terminal apparatus 200.

When receiving the paging ID (PI) aiming for the terminal apparatus on the basis of the monitoring result of the monitoring unit 210, the paging-related information return unit 220 returns paging-related information indicating a specific antenna beam which the terminal apparatus 200 can receive in a downlink.

Specifically, according to an embodiment, when receiving the paging ID (PI) on the basis of the monitoring result of the monitoring unit 210, the paging-related information return unit 220 may return paging-related information including terminal identification information (for example, a UE ID) of the terminal apparatus 100 and cell information and beam information of the specific antenna beam used when the terminal apparatus 200 receives the paging ID (PI).

For example, when the BS apparatus 100 performs a beam sweeping operation for transmitting a paging ID (PI) of a paging group to which terminal 2 belongs in a situation illustrated in FIG. 1, the terminal apparatus 200 (terminal 2) receives the paging ID (PI) having the largest signal reception intensity through antenna beam #2 of cell C1, that is, antenna beam C1_#2.

In this case, the paging-related information return unit 220 may return the paging-related information including the terminal identification information (for example, the UE ID) of the terminal apparatus 200 (terminal 2), and cell information (C1) and beam information (#2) indicating antenna beam C1_#2.

According to another embodiment, when receiving the paging ID (PI) on the basis of the monitoring result of the monitoring unit 210, the paging-related information return unit 220 may return the paging-related information including the terminal identification information (for example, the UE ID) of the terminal apparatus 200 through uplink resources related to a time slot when the terminal apparatus 200 receives the paging ID (PI) among a plurality of time slots of PO resources pre-allocated to the terminal apparatus 200.

For example, when the BS apparatus 100 performs a beam sweeping operation for transmitting a paging ID (PI) of a paging group to which terminal 2 belongs in a situation illustrated in FIG. 1, the terminal apparatus 200 (terminal 2) receives the paging ID (PI) in a specific slot at a time point at which the BS apparatus 100 transmits the paging ID (PI) through antenna beam #2 of cell C1, that is, antenna beam C1_#2 among a plurality of time slots included in the pre-allocated PO resources.

In this case, the paging-related information return unit 220 may return the paging-related information including the terminal identification information (for example, the UE ID) of terminal apparatus 200 (terminal 2) through uplink resources related to a specific time slot (a time slot of antenna beam C1_#2) in which the terminal apparatus 200 (terminal 2) receives the paging ID (PI).

Then, when the terminal apparatus 200 (terminal 2) is the terminal to be paged, the BS apparatus 100 may identify the terminal apparatus 200 (terminal 2) as the terminal to be paged on the basis of the paging-related information returned from the terminal apparatus 200 (terminal 2) and recognize (identify) an optimal specific antenna beam (downlink resources) for the terminal apparatus 200 (terminal 2).

As described above, according to the BS apparatus and the terminal apparatus according to an embodiment of the present disclosure, it is possible to derive an effect of improving paging efficiency in a communication system by implementing a new paging method (scheme) of minimizing signaling load of a radio section and performing rapid and accurate paging without performance deterioration when paging is performed in a MIMO system (particularly, a future 5G environment) using a beamforming technology based on a plurality of antenna beams.

Figure 4:
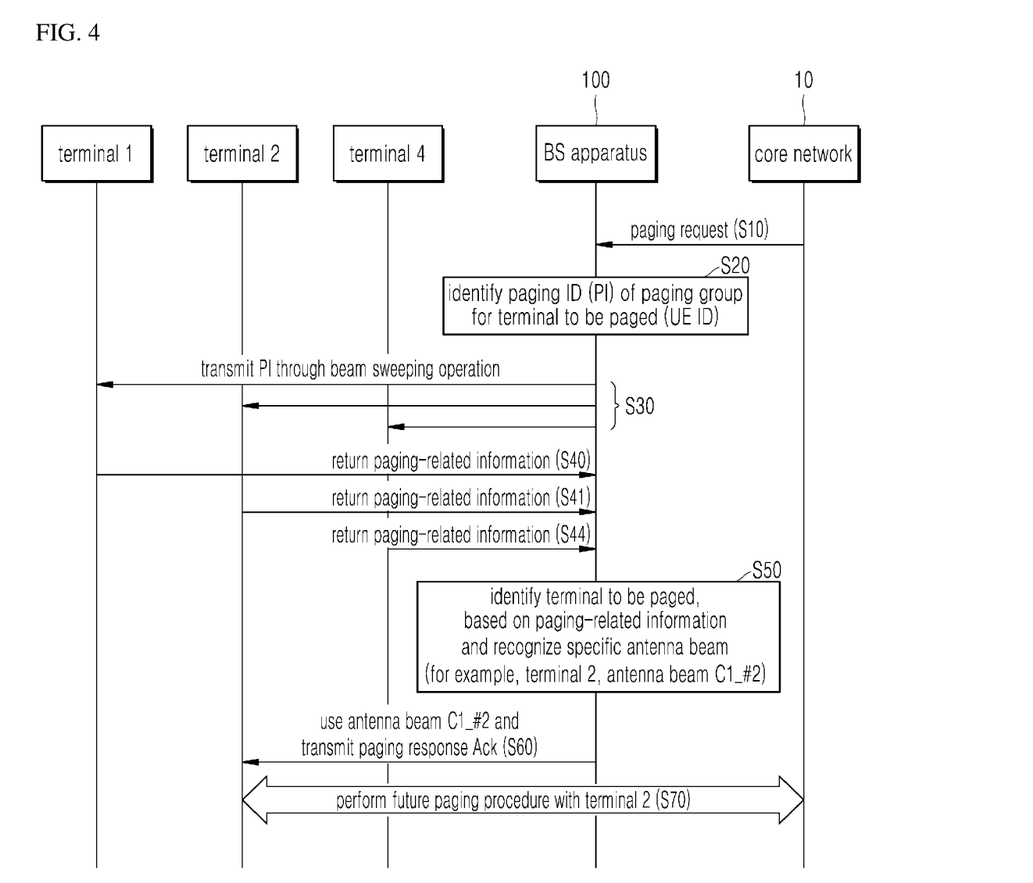
FIG. 4 illustrates a flow of paging in a MIMO system according to a paging scheme of the present disclosure.

Hereinafter, flow of paging in a MIMO system according to a paging method (scheme) of the present disclosure is described with reference to FIG. 4.

Basically, the BS apparatus 100 allocates radio resources (PO) for paging to each terminal in radio resources designated for paging in units of predefined paging cycles (DRX cycles).

According to the present disclosure, when there is a terminal to be paged (for example, terminal 2), for which a paging request is received from the core network 10 in S10, the BS apparatus 100 identifies a paging ID (PI) of a paging group to which the terminal to be paged, that is, terminal 2 belongs in S20.

To this end, it is preferable that the BS apparatus 100 manages a paging group for each terminal and a paging ID for each paging group.

Hereinafter, for convenience of description, it is assumed that all of terminals 1, 2, 3, and 4 are in the state in which radio section access is released (for example, an idle state or an RRC inactive state), and it is assumed that terminals 1, 2, and 4 are managed as the same paging group and use the same paging ID (PI) and terminal 3 is managed as another paging group and uses another PI in the situation illustrated in FIG. 1.

According to the present disclosure, the BS apparatus 100 transmits the paging ID (PI) identified in step S20 in a plurality of different directions through a beam sweeping operation for transmitting beamformed signals in different directions through a plurality of antenna beams in S30.

More specifically, the BS apparatus 100 may transmit the paging ID (PI) of the paging group to which terminal 2 belongs in a plurality of different directions by performing the beam sweeping operation in paging resources, that is, PO resources pre-allocated to the terminal to be paged, that is, terminal 2.

Each of terminals 1, 2, 3, and 4 monitors whether a paging signal (for example, the paging ID (PI)) aiming for the terminal itself is received in PO resources allocated to the terminal itself.

According to the present disclosure, terminal 2 receives the paging ID (PI) which the BS apparatus 100 transmits in PO resources allocated to terminal 2 itself, that is, the paging signal aiming for terminal 2 itself, and if terminals 1 and 4 also receive allocation of PO resources which are the same as those of terminal 2, terminals 1 and 4 receive the paging ID (PI) which the BS apparatus 100 transmits, that is, the paging ID (PI) of the paging group to which terminal 2 belongs.

In this case, according to the present disclosure, not only terminal 2 but also terminals 1 and 4 return paging-related information to the BS apparatus 100 in response to reception of the paging ID (PI) of the terminals themselves and, more specifically, return paging-related information indicating specific antenna beams which the terminals can receive in a downlink in S40, S41, and S44.

According to the present disclosure, the BS apparatus 100 identifies the terminal to be paged among terminals receiving the paging ID (PI) on the basis of paging-related information returned from the terminal receiving the paging IP (PI) transmitted in step S30 and recognizes a specific antenna beam which the terminal to be paged can receive in a downlink in S50.

Specifically, when paging-related information is returned from a plurality of terminals receiving the paging ID (PI) transmitted in step S30, the BS apparatus 100 may identify, as the terminal to be paged, a terminal having terminal identification information (for example, the UE ID) that matches terminal identification information of the terminal to be paged (for example, the UE ID of terminal 2) among terminals 1, 2, and 4 of the terminal identification information (for example, the UE ID) included in each piece of paging-related information.

Further, the BS apparatus 100 may recognize an optimal specific antenna beam (antenna beam C1_#2) which terminal 2 can receive in a downlink on the basis of cell information (C1) and beam information (#2) included in the paging-related information returned from terminal 2 identified as the terminal to be paged and uplink resources through which the paging-related information is returned.

According to the present disclosure, when the specific antenna beam which terminal 2 can receive in a downlink, that is, antenna beam C1_#2 is recognized, the BS apparatus 100 may perform a paging procedure for terminal 2 by transmitting paging response Ack to terminal 2 through specific antenna beam C1_#2 and performing a general base procedure for future paging in S60 and S70.

Figure 5:
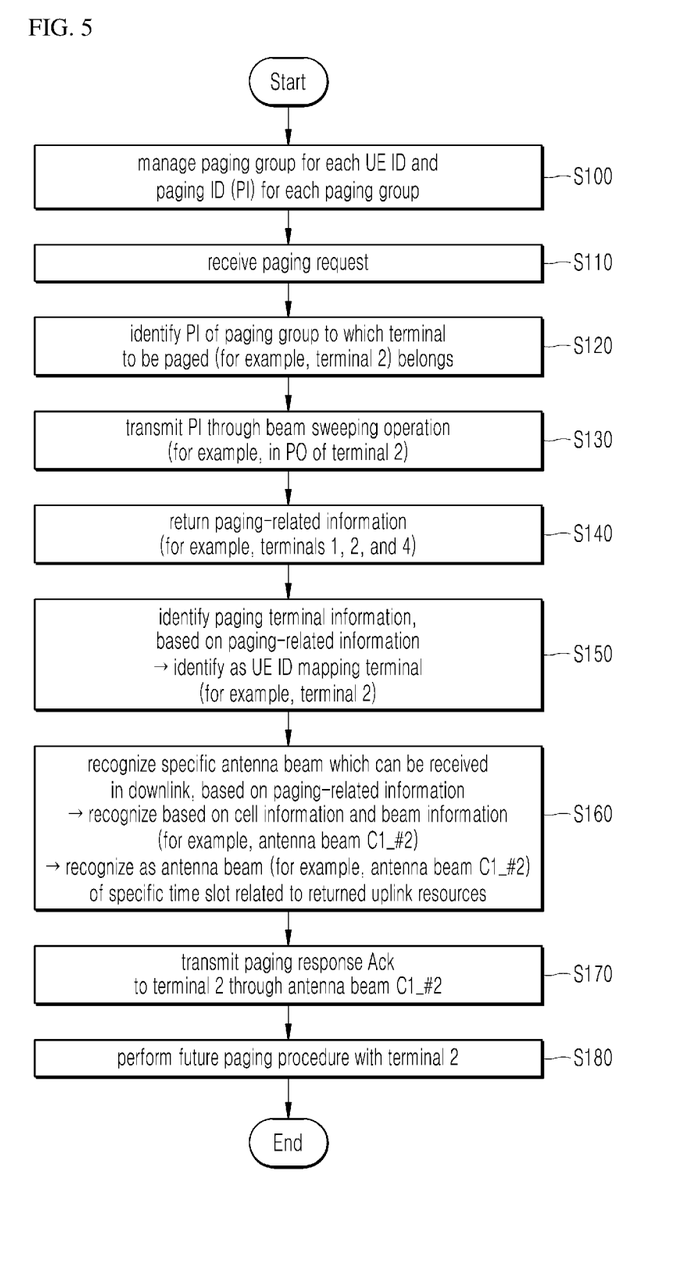
FIG. 5 illustrates a flow of a method of performing paging by a BS apparatus according to an embodiment of the present disclosure.

Hereinafter, a method of performing paging by a BS apparatus according to an embodiment of the present disclosure is described with reference to FIG. 5.

Through the method of performing paging according to an embodiment of the present disclosure, the BS apparatus 100 may manage a paging group for each terminal (UE ID) and manage a paging ID (PI) for each paging group in S100.

Through the method of performing paging according to an embodiment of the present disclosure, when a paging request is received from the core network 10 in S110, the BS apparatus 100 identifies, for the terminal to be paged (for example, terminal 2) for which the paging request is received, a paging ID (PI) of a paging group to which the terminal to be paged, that is, terminal 2 belongs in S120.

Through the method of performing paging according to an embodiment of the present disclosure, the BS apparatus 100 may transmit the paging ID (PI) of the paging group to which terminal 2 belongs in different directions by performing a beam sweeping operation in paging resources, that is, PO resources pre-allocated to the terminal to be paged, that is, terminal 2 in S130.

Hereinafter, for convenience of description, it is assumed that the BS apparatus 100 operates three (M=3) cells (C1, C2, and C3) and forms six (N=6) antenna beams #1, #2 . . . , #6 for each cell.

Based on the assumption, the BS apparatus 100 transmits the paging PI of the paging group to which terminal 2 belongs for each of six antenna beams C1_#1, C1_#2 . . . , C1_#6 in cell C1, for each of six antenna beams C2_#1, C2_#2 . . . , C2_#6 in cell C2, and for each of six antenna beams C3_#1, C3_#2 . . . , C3_#6 in cell C3 by performing the beam sweeping operation for transmitting the paging ID (PI) of the paging group to which terminal 2 belongs in PO resources pre-allocated to the terminal to be paged, that is, terminal 2.

Meanwhile, each of terminals 1, 2, 3, and 4 monitors whether a paging signal (for example, the paging ID (PI)) aiming for the terminal itself is received in PO resource allocated to the terminal itself.

Accordingly, terminal 2 receives the paging ID (PI) which the BS apparatus 100 transmits in PO resources allocated to terminal 2, that is, the paging ID (PI) aiming for terminal 2 itself, and if terminals 1 and 4 also receive allocation of the PO resources which are the same as those of terminal 2, terminals 1 and 4 receive the paging ID (PI) which the BS apparatus 100 transmits.

In this case, not only terminal 2 but also terminals 1 and 4 return paging-related information to the BS apparatus 100 in response to reception of the paging ID (PI) of the terminals themselves and, more specifically, return paging-related information indicating specific antenna beams which the terminals can receive in a downlink.

Through the method of performing paging according to an embodiment of the present disclosure, when the BS apparatus 100 receives the paging-related information from terminals 1, 2, and 4 as described above in S140, the BS apparatus 100 may identify, as the terminal to be paged, the terminal having terminal identification information (for example, the UE ID) that matches terminal identification information (for example, the UE ID of terminal 2) of the terminal to be paged among terminals 1, 2, and 4 of the terminal identification information (for example, the UE ID) included in each piece of paging-related information in S150.

For example, the BS apparatus 100 identifies, as the terminal to be paged, terminal 2 among the plurality of terminals 1, 2, and 4 receiving the paging ID (PI) transmitted in S130.

Through the method of performing paging according to an embodiment of the present disclosure, the BS apparatus 100 may recognize a specific beam which terminal 2 can receive in a downlink on the basis of the paging-related information returned from the identified terminal to be paged, that is, terminal 2 in S160.

According to an embodiment, the BS apparatus 100 may recognize a specific antenna beam which terminal 2 can receive in a downlink on the basis of cell information and beam information included in the paging-related information returned from the identified terminal to be paged, that is, terminal 2.

Specifically, the paging-related information returned by the terminal basically includes terminal identification information (for example, the UE ID) of the terminal returning the corresponding paging-related information and may further include cell information and beam information indicating an antenna beam through which the terminal receives the paging ID (PI) having the largest signal reception intensity.

For example, when the BS apparatus 100 transmits the paging ID (PI) of the paging group to which terminal a2 belongs through the beam sweeping operation in a situation illustrated in FIG. 1, terminal 2 receives the paging ID (PI) having the largest signal reception intensity through antenna beam #2 of cell C1, that is, antenna beam C1_#2.

In this case, the paging-related information returned by terminal 2 may include terminal identification information (for example, the UE ID) of terminal 2, and cell information (C1) and beam information (#2) indicating antenna beam C1_#2.

Accordingly, the BS apparatus 100 may recognize specific antenna beam C1_#2 which terminal 2 can receive in downlink on the basis of cell information (C1) and beam information (#2) included in the paging-related information returned by terminal 2.

According to another embodiment, the BS apparatus 100 may recognize, as the specific antenna beam which terminal 2 can receive in downlink, an antenna beam of a specific time slot related to uplink resources through which paging-related information is returned by terminal 2 among a plurality of time slots of PO resources pre-allocated to the identified terminal to be paged, that is, terminal 2.

Specifically, the paging-related information from the terminal is returned through uplink resources related to a time slot when the terminal receives the paging ID (PI) aiming for the terminal among a plurality of time slots of PO resources pre-allocated to the terminal.

Then, in the situation illustrated in FIG. 1, terminal 2 receives the paging ID (PI) in a specific time slot at a time point at which the BS apparatus 100 transmits the paging ID (PI) through antenna beam #2 of cell C1, that is, antenna beam C1_#2 through the beam sweeping operation among a plurality of time slots included in pre-allocated PO resources.

In this case, the paging-related information from terminal 2 includes terminal identification information (for example, the UE ID) of terminal 2 and may be returned through uplink resources related to a specific time slot (a time slot of antenna beam C1_#2) in which terminal 2 receives the paging ID (PI)

The BS apparatus 100 may recognize an antenna beam of a specific time slot related to uplink resources, that is, antenna beam C1_#2 as a specific antenna which terminal 2 can receive in downlink on the basis of uplink resources through which paging-related information is returned from terminal 2.

Further, through the method of performing paging according to an embodiment of the present disclosure, the BS apparatus 100 may perform a paging procedure of terminal 2 by transmitting paging response Ack to terminal 2 through specific antenna beam C1_#2 recognized in step S160 and performing a general base procedure for future paging in S170 and S180.

Accordingly, the BS apparatus 100 does not perform the paging procedure any more for terminals 1 and 4 having no actual paging request (for example, generation of a terminated call).

Figure 6:
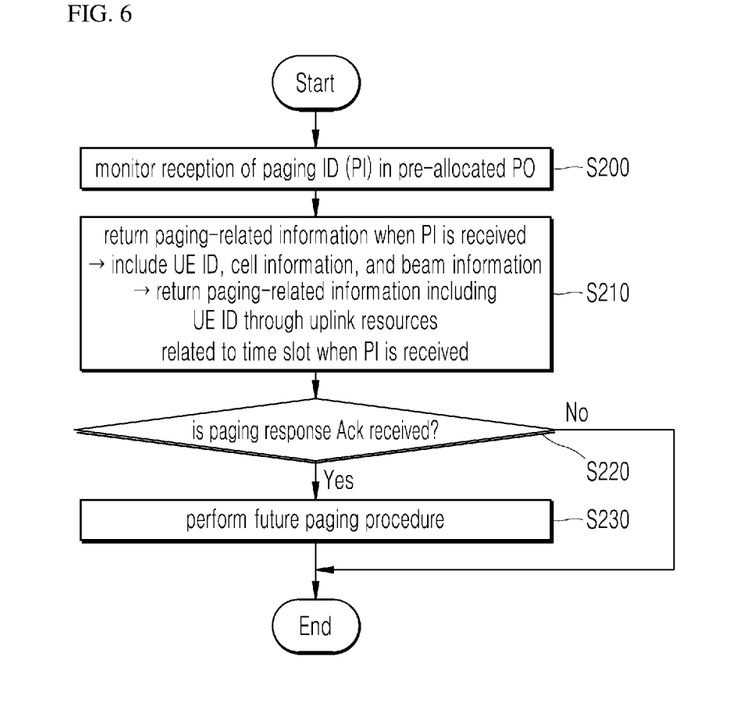
FIG. 6 illustrates a flow of a method of supporting paging by a terminal apparatus according to an embodiment of the present disclosure.

Hereinafter, a method of supporting paging by a terminal apparatus according to an embodiment of the present disclosure is described with reference to FIG. 6.

Through the method of supporting paging according to an embodiment of the present disclosure, the terminal apparatus 200 monitors reception of a paging ID (IP) aiming for the terminal apparatus itself in pre-allocated paging resources, that is, PO resources in S200.

That is, on the basis of the assumption that the terminal apparatus 200 recognizes the paging ID (PI) (aiming for the terminal apparatus itself) to be used by the terminal apparatus itself, the terminal apparatus 200 monitors whether a paging signal (for example, the paging ID (PI)) aiming for the terminal apparatus 200 itself is received in pre-allocated PO resources.

Through the method of supporting paging according to an embodiment of the present disclosure, when receiving the paging ID (PI) on the basis of the monitoring result in step S200, the terminal apparatus 200 returns paging-related information indicating a specific antenna beam which the terminal apparatus 200 can receive in a downlink in S210.

Specifically, according to an embodiment, when receiving the paging ID (PI), the terminal apparatus 200 may return paging-related information including terminal identification information (for example, a UE ID) of the terminal apparatus 100 and cell information and beam information of a specific antenna used when the terminal apparatus 200 receives the paging ID (PI).

For example, when the BS apparatus 100 performs a beam sweeping operation for transmitting a paging ID (PI) of a paging group to which terminal 2 belongs in a situation illustrated in FIG. 1, the terminal apparatus 200 (terminal 2) receives the paging ID (PI) having the largest signal reception intensity through antenna beam #2 of cell C1, that is, antenna beam C1_#2.

In this case, the terminal apparatus 200 may return the paging-related information including the terminal identification information (for example, the UE ID) of the terminal apparatus 200 (terminal 2), and cell information (C1) and beam information (#2) indicating antenna beam C1_#2.

According to another embodiment, when receiving the paging ID (PI), the terminal apparatus 200 may return the paging-related information including the terminal identification information (for example, the UE ID) of the terminal apparatus 200 through uplink resources related to a time slot when the terminal apparatus 200 receives the paging ID (PI) among a plurality of time slots of pre-allocated PO resources.

For example, when the BS apparatus 100 performs a beam sweeping operation for transmitting a paging ID (PI) of a paging group to which terminal 2 belongs in a situation illustrated in FIG. 1, the terminal apparatus 200 (terminal 2) receives the paging ID (PI) in a specific slot at a time point at which the BS apparatus 100 transmits the paging ID (PI) through antenna beam #2 of cell C1, that is, antenna beam C1_#2 among a plurality of time slots included in the pre-allocated PO resources.

In this case, the terminal apparatus 200 may return the paging-related information including the terminal identification information (for example, the UE ID) of terminal apparatus 200 (terminal 2) through uplink resources related to a specific time slot (a time slot of antenna beam C1_#2) in which the terminal apparatus 200 (terminal 2) receives the paging ID (PI).

Then, when the terminal apparatus 200 (terminal 2) is the terminal to be paged, the BS apparatus 100 may identify the terminal apparatus 200 (terminal 2) as the terminal to be paged on the basis of the paging-related information returned from the terminal apparatus 200 (terminal 2) and recognize (identify) an optimal specific antenna beam (downlink resources) for the terminal apparatus 200 (terminal 2).

Through the method of supporting paging according to an embodiment of the present disclosure, when paging response Ack is received from the BS apparatus 100 (Yes in S200), the terminal apparatus 200 may perform a general base paging procedure for future paging in S230.

As described above, according to an embodiment of the present disclosure, it is possible to derive an effect of improving paging efficiency in a communication system by implementing a new paging method (scheme) of minimizing signaling load of a radio section and performing rapid and accurate paging without performance deterioration when paging is performed in a MIMO system (particularly, a future 5G environment) using a beamforming technology based on a plurality of antenna beams.

The method of performing paging and the method of supporting paging according to embodiments of the present disclosure may be implemented in the form of a program instruction that can be executed through various computer means and recorded in a computer-readable medium. The computer readable medium may include a program command, a data file, a data structure, and the like independently or in combination. The program command recorded in the medium may be things specially designed and configured for the present disclosure, or things that are well known to and can be used by those skilled in the computer software related art. Examples of the computer-readable recording medium include magnetic media such as hard disks, floppy disks and magnetic tapes, optical media such as a Compact Disc Read-Only Memory (CD-ROM) and a Digital Versatile Disc (DVD), magneto-optical media such as floppy disks, and hardware devices such as a Read-Only Memory (ROM), a Random Access Memory (RAM) and a flash memory, which are specially configured to store and perform program instructions. Examples of the program command include a machine language code generated by a compiler and a high-level language code executable by a computer through an interpreter and the like. The hardware device may be configured to operate as one or more software modules in order to perform operations of the present disclosure, and vice versa.

Although the present disclosure has been described in detail with reference to exemplary embodiments, the present disclosure is not limited thereto and it is apparent to those skilled in the art that various modifications and changes can be made thereto without departing from the scope of the present disclosure.

What is claimed is:

1. An apparatus of a Base Station (BS), the apparatus comprising:
    an identification unit configured to identify, for a terminal to be paged, a paging ID of a paging group to which the terminal to be paged belongs;
    a transmission unit configured to transmit the identified paging ID of the paging group in different directions through a beam sweeping operation for transmitting beamformed signals in different directions through a plurality of antenna beams; and
    a paging performance unit configured to identify the terminal to be paged among terminals receiving the paging ID of the paging group, based on paging-related information returned from the terminal receiving the paging ID of the paging group and perform a paging procedure for the identified terminal to be paged,
    wherein the paging performance unit is configured to recognize a specific antenna beam which the terminal to be paged is able to receive a downlink, based on the paging-related information returned from the terminal to be paged and perform the paging procedure for the terminal to be paged through the recognized specific antenna beam,
    wherein the paging performance unit is configured to recognize, as the specific antenna beam, an antenna beam of a specific time slot related to uplink resources through which the paging-related information is returned from the terminal to be paged among the plurality of time slots of paging resources pre-allocated to the terminal to be paged, and
    wherein the paging-related information comprises terminal identification information, and wherein the paging ID is defined to have a size smaller than that of the terminal identification information for identifying the terminal to be paged.

2. The apparatus of claim 1, wherein the transmission unit is configured to perform the beam sweeping operation in paging resource pre-allocated to the terminal to be paged.

3. The apparatus of claim 1, wherein the specific antenna beam is an antenna beam used when the terminal to be paged receives the paging ID among antenna beams for transmitting the paging ID in different directions through the beam sweeping operation.

4. The apparatus of claim 1, wherein the paging performance unit is configured to recognize the specific antenna beam, based on cell information and beam information included in the paging-related information returned from the terminal to be paged.

5. A method of performing paging by a Base Station (BS) apparatus, the method comprising:
    identifying, for a terminal to be paged, a paging ID of a paging group to which the terminal to be paged belongs;
    transmitting the identified paging ID of the paging group in different directions through a beam sweeping operation for transmitting beamformed signals in different directions through a plurality of antenna beams; and identifying the terminal to be paged among terminals receiving the paging ID of the paging group, based on paging-related information returned from the terminal receiving the paging ID of the paging group performing a paging procedure for the identified terminal to be paged, wherein the performing the paging procedure comprises:

recognizing a specific antenna beam which the terminal to be paged is able to receive a downlink, based on the paging-related information returned from the terminal to be paged and performing the paging procedure for the terminal to be paged through the recognized specific antenna beam, and recognizing, as the specific antenna beam, an antenna beam of a specific time slot related to uplink resources through which the paging-related information is returned from the terminal to be paged among a plurality of time slots of paging resources pre-allocated to the terminal to be paged, and wherein the paging-related information comprises terminal identification information, and wherein the paging ID is defined to have a size smaller than that of the terminal identification information for identifying the terminal to be paged.

6. The method of claim 5, wherein the performing the paging prodecure comprises:

recognizing the specific antenna beam, based on cell information and beam information included in the paging-related information.

7. An apparatus of a terminal, the apparatus comprising:
a monitoring unit configured to monitor reception of a paging ID in pre-allocated paging resources; and
a paging-related information return unit configured to, when receiving the paging ID, return paging-related information indicating a specific antenna beam which the apparatus of the terminal is able to receive a downlink, thereby when the apparatus of the terminal is a terminal to be paged, a Base Station (BS) transmitting the paging ID being able to identify the apparatus of the terminal as the terminal to be paged, based on the paging-related information and perform a paging procedure for the apparatus of the terminal, wherein the paging-related information comprises terminal identification information of the apparatus of the terminal, and the paging-related information return unit is configured to return the paging-related information through uplink resources related to a time slot for receiving the paging ID among a plurality of time slots of the pre-allocated paging resources, and wherein the paging ID is defined to have a size smaller than that of the terminal identification information for identifying the terminal.

8. The apparatus of claim 7, wherein cell information and beam information of the specific antenna beam used when the apparatus of the terminal receives the paging ID.

9. A method of supporting paging of a terminal apparatus, the method comprising:

monitoring reception of a paging ID in pre-allocated paging resources; and returning, when the paging ID is received, paging-related information indicating a specific antenna beam which the apparatus of the terminal is able to receive a downlink, thereby when the apparatus of the terminal is the terminal to be paged, a Base Station (BS) transmitting the paging ID being able to identify the apparatus of the terminal as a terminal to be paged, based on the paging-related information and perform a paging procedure for the apparatus of the terminal, wherein the paging-related information comprises terminal identification information of the apparatus of the terminal, wherein the paging ID is defined to have a size smaller than that of the terminal identification information for identifying the terminal; and the returning comprises;

returning the paging-related information through uplink resources related to a time slot for receiving the paging ID among the plurality of time slots of the pre-allocated paging resources.

10. The method of claim 9, wherein cell information and beam information of the specific antenna beam used when the apparatus of the terminal receives the paging ID.

* * * * *